Aug. 25, 1942.                P. F. SPERRY                2,294,250
                            FOOTAGE INDICATOR
                        Original Filed Oct. 29, 1938
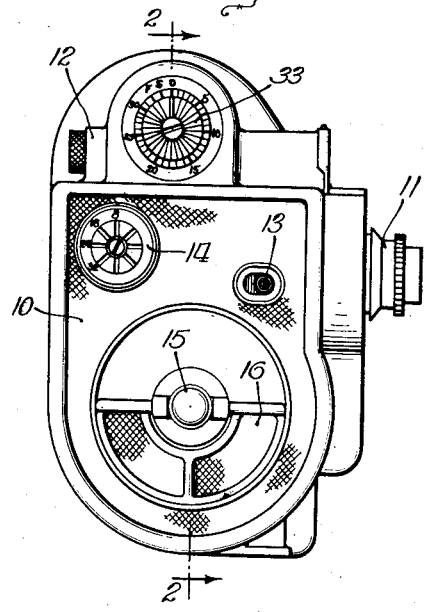
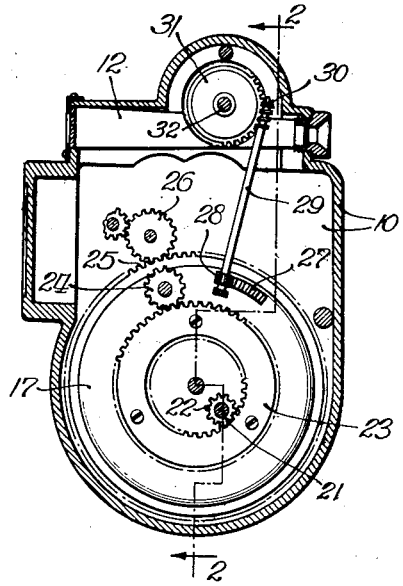
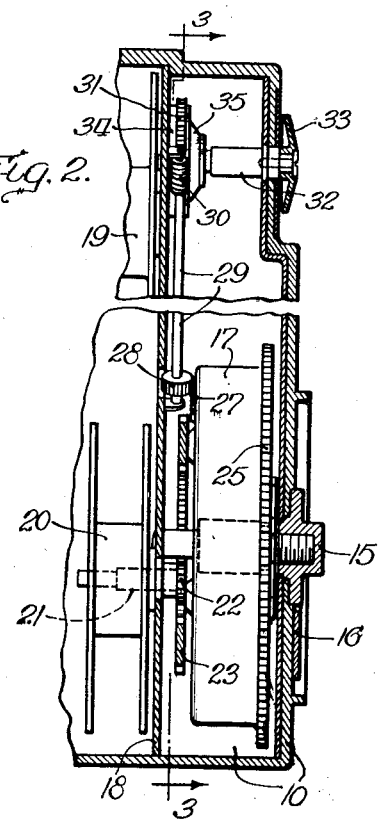
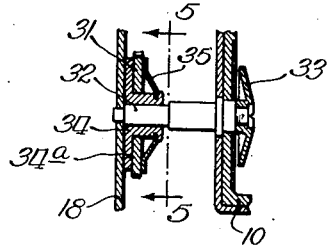
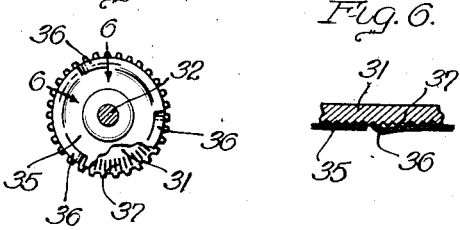
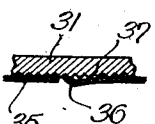
INVENTOR,—
Philmore F. Sperry
BY Zabel, Carlson, Gritzbaugh and Wills,
Attys.

Patented Aug. 25, 1942

2,294,250

UNITED STATES PATENT OFFICE 2,294,250

FOOTAGE INDICATOR

Philmore F. Sperry, Chicago, Ill., assignor to Revere Camera Company, Chicago, Ill., a corporation of Delaware Original application October 29, 1938, Serial No. 237,667. Divided and this application August 2, 1940, Serial No. 349,396

4 Claims. (Cl. 88—16)

This application is being filed as a division of my co-pending application Serial No. 237,667, filed October 29, 1938, which has resulted in Letters Patent No. 2,214,185, granted September 10, 1940.

This invention relates to footage indicators for use in connection with moving picture cameras or other devices in which films are used and in connection with which it is important that the operator shall know at all times in the use of the device how many feet of film are still available for use. It is the object of the invention, accordingly, to provide a new and improved form and arrangement of parts by which the operator can determine quickly and easily at any time the amount of film remaining unused in the camera. It is another object of the invention to provide an improved arrangement with respect to the resetting of the indicator in each instance at the start of the exposure of a new film.

It is another object of the invention to improve mechanisms of this type in sundry details hereinafter pointed out. The preferred means by which the several objects have been attained are illustrated in the accompanying drawing, in which—

Fig. 1 is a face view of a camera provided with my improved footage indicator means;

Fig. 2 is a vertical sectional view taken substantially at the line 2—2 of Fig. 1 or the line 2—2 of Fig. 3;

Fig. 3 is a vertical sectional view taken on a reduced scale substantially at the line 3—3 of Fig. 2;

Fig. 4 is a view similar to a portion of Fig. 2 but with additional parts shown in section;

Fig. 5 is a vertical sectional view taken substantially at the line 5—5 of Fig. 4; and Fig. 6 is a sectional view taken substantially at the curved line 6—6 of Fig. 5.

Referring now to the several figures of the drawing, in which corresponding parts are indicated by the same reference characters, 10 indicates the casing of a camera of any approved type, provided with a lens system 11, a finder 12, a starting control member 13, speed control means 14, and a winding cap 15 and key 16 for the spring motor 17. In the arrangement shown a partition 18 is provided across the casing, (see Fig. 2), with a loading reel 19 and a rewinding reel 20 rotatably mounted at the left of the partition as shown in said Fig. 2, the rewinding reel being operatively connected with the motor 17 through the medium of a shaft 21 on which the reel is mounted, a pinion 22 on said shaft meshing with a ring gear 23 carried by the driven housing of the motor. The ring gear 23 also meshes with a pinion 24 for operating control means for the film to be used in the camera. The motor 17 is provided with a large gear 25 which drives a pinion 26 for giving the film the desired intermittent movement. Inasmuch as the parts so far described correspond with the showing of my said earlier application and form in and of themselves no part of the present invention, it is believed to be unnecessary to describe the same further herein.

My improved footage indicator comprises a plurality of teeth 27 mounted on the face of the housing of the motor 17, such teeth comprising in effect a segmental gear of comparatively very small size angularly, such segmental gear being positioned concentrically about the axis of the motor. For engagement with the teeth 27 upon each complete revolution of the motor 17, I have provided a pinion 28 fixedly mounted on a shaft 29 which is provided at its upper end with a worm 30 meshing in turn with a worm gear 31 supported by a shaft 32 extending at one end through the wall of the casing 10 of the camera. Upon the outer end of the shaft 32, I have mounted a graduated head 33 calibrated in feet of film. The arrangement is such that upon each complete revolution of the housing of the motor 17 the shaft 29 is given a rotary movement for rotating very slightly the shaft 32 and the head 33, the rotation of the head 33 being proportional to the movement of the film through the camera, and the graduations in connection with the head 33 being arranged to correspond with the movement of the film.

As is clearly shown in the drawing, (see Figs. 4, 5 and 6), the connections between the worm gear 31 and the shaft 32 comprise a releasable driving mechanism adapted normally to drive the shaft 32 and the head 33 with the worm gear but adapted to permit rotation of the shaft with respect to the worm gear when required. For attaining this result, I have employed a hub or collar 34 fixedly mounted on the shaft 32 with a flange 34a extending outwardly from the hub, the worm gear 31 being loosely mounted upon the hub or collar. The worm gear is yieldingly connected with the hub or collar 34 by means of a disc 35 fixedly mounted upon the hub, with resilient lugs or teeth 36 on the disc yieldingly engaging teeth 37 formed in the side face of the worm gear 31, (see Fig. 5). By the use of the arrangement as shown, the worm gear 31 is effective for driving the shaft 32 in counterclockwise direction in Fig. 1 under normal operating conditions. The graduated head 33 and the parts connected therewith can however be rotated readily by pressure applied manually thereon independently of rotation of the worm gear 31, the lugs 36 being adapted to slide over the teeth 37 for permitting the head, at the start of the use of a new film, to be set at zero or any other desired indicating position corresponding to the length of film available for exposure. When pressure is applied directly upon the head 33 for turning the head and the shaft 32, the worm 30 serves as a locking means for preventing rotation of the worm gear 31 so as to enable the operator easily to effect a resetting operation.

By the use of my improved arrangement, the indicator 33 is kept at all times in position to show the number of feet of film still available for use, for enabling the operator easily to compute the number of exposures possible before reloading.

While I prefer to employ the form and arrangement of parts as shown by the drawing and as above described, the invention is not to be limited to such form and arrangement except so far as the claims may be so limited, it being understood that changes might well be made in the form and arrangement of parts without departing from the spirit of the invention.

I claim:

1. In a mechanism of the type described, the combination of a casing, a spring motor in said casing comprising a rotatably mounted housing through which power is applied, means actuated by said motor for forwarding a film of predetermined length within said casing, a plurality of teeth on said housing constituting a segmental gear of comparatively very small size angularly, a shaft rotatably mounted adjacent to said housing, a pinion on said shaft adapted by engagement with said segmental gear to give said shaft an intermittent rotary movement in timed relation to the movement of the film, a second shaft rotatably mounted in said casing and extending outwardly through the wall of the casing, connections between said shafts comprising a worm and gear and yieldingly acting means for driving said second shaft and permitting it to be turned manually independently of the first-named shaft into changed driving relation, and an indicator on said second shaft outside of said casing adapted to show the length of film still unused and adapted upon the insertion of a new film to be reset by the manual turning of said shaft and indicator.

2. In a mechanism of the type described, the combination of a casing, a spring motor in said casing comprising a rotatably mounted housing through which power is applied from the motor, means actuated by said motor for forwarding a film of predetermined length within said casing, a plurality of teeth on said housing constituting a segmental gear of comparatively very small size angularly, a shaft rotatably mounted in substantially radial position with respect to said housing, a pinion on said shaft in position for engagement with said teeth at each revolution of the housing for giving said shaft an intermittent rotary movement in timed relation to the movement of the film, a second shaft rotatably mounted in said casing at substantially right angles to said first-named shaft and extending outwardly at one end through the wall of the casing, a worm fixedly mounted on said first-named shaft, a worm gear on said second shaft meshing with said worm and having a series of teeth on one side face, a member fixedly mounted on said second shaft and having a resilient lug engaging the teeth on the side face of said worm gear for driving the said shaft releasably with said worm gear, and an indicator on said second shaft outside of said casing adapted to show the length of film still unused and adapted to be reset upon the insertion of a new film.

3. In a mechanism of the type described, the combination of a casing, a spring motor in said casing comprising a rotatably mounted housing through which power is applied from the motor, means actuated by said motor for forwarding a film of predetermined length within said casing, a plurality of teeth on said housing constituting a segmental gear of comparatively very small size angularly, a shaft rotatably mounted in substantially radial position with respect to said housing, a pinion on said shaft in position for engagement with said teeth at each revolution of the housing for giving said shaft an intermittent rotary movement in timed relation to the movement of the film, a second shaft rotatably mounted in said casing at substantially right angles to said first-named shaft and extending outwardly at one end through the wall of the casing, a worm fixedly mounted on said first-named shaft, a hub fixedly mounted on said second shaft and having an outwardly extending flange thereon, a worm gear loosely mounted on said hub in position to mesh with said worm and having a series of teeth on its side face disposed away from said flange, a resilient disc fixedly mounted on said hub and having a lug engaging the teeth on the adjacent side face of said worm gear for driving the shaft from the gear, and an indicator on said second shaft outside of said casing adapted to show the length of film still unused and adapted to be reset by a manual turning of said second shaft upon the insertion of a new film.

4. In a mechanism of the type described, the combination of a casing, a spring motor in said casing for forwarding a film of predetermined length within the casing, said motor comprising a rotatably mounted housing through which power is applied from the motor, a plurality of teeth on the housing constituting a segmental gear of comparatively small size angularly, a pinion rotatably mounted in position for intermittent engagement with said segmental gear as said housing rotates, a second gear rotatably mounted adjacent to said housing, means for driving said second gear by power from said pinion, a shaft on which said second gear is rotatably mounted, a spring tooth carried by said shaft adapted by engagement with said second gear normally to drive said shaft but arranged so as to permit the shaft to be turned manually independently of the second gear, and an indicator on said shaft calibrated by reference to the speed of driving of said shaft by said motor for showing the length of film unused at any point in the operation of the mechanism.

PHILMORE F. SPERRY.